United States Patent [19]
Junkin

[11] Patent Number: 5,860,862
[45] Date of Patent: Jan. 19, 1999

[54] INTERACTIVE SYSTEM ALLOWING REAL TIME PARTICIPATION

[75] Inventor: William W. Junkin, Dana Point, Calif.

[73] Assignee: William W. Junkin Trust, Irvine, Calif.

[21] Appl. No.: 583,408

[22] Filed: Jan. 5, 1996

[51] Int. Cl.$^6$ .................................................. A63F 9/00
[52] U.S. Cl. ................................. 463/40; 463/1; 463/9
[58] Field of Search ........................... 463/1, 9, 40, 41, 463/42

[56] References Cited

U.S. PATENT DOCUMENTS

| | | | |
|---|---|---|---|
| 5,013,038 | 5/1991 | Luxenberg et al. | 463/40 |
| 5,114,155 | 5/1992 | Tillery et al. | 463/42 |

*Primary Examiner*—Jessica Harrison
*Attorney, Agent, or Firm*—McDermott, Will & Emery

[57] ABSTRACT

An interactive apparatus and method allows the participants to compete in an interactive game based on an event which is occurring in real time. A ticker tape or some other visual display or audio broadcast or the like is shown or broadcast on a device of an interactive apparatus with real time score values indicative of the players' performance in the event. Using the interactive apparatus, the participants select and trade members on the team using a menu displayed or broadcast on the interactive device. The menu provides relevant information regarding the performance of the participant's team, and allows the participant to select and trade members on the participant's team with members listed in a contest roster database while the event is occurring in real time. By allowing the participant to interact in real time, the intellectual challenge and emotional enjoyment of the interactive game are greatly enhanced.

30 Claims, 4 Drawing Sheets

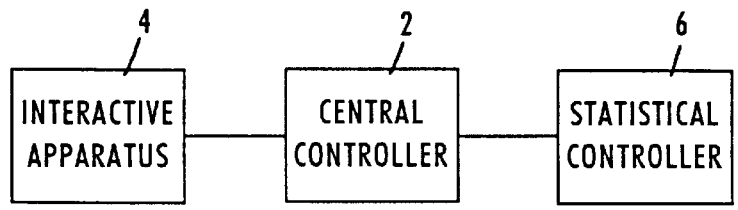
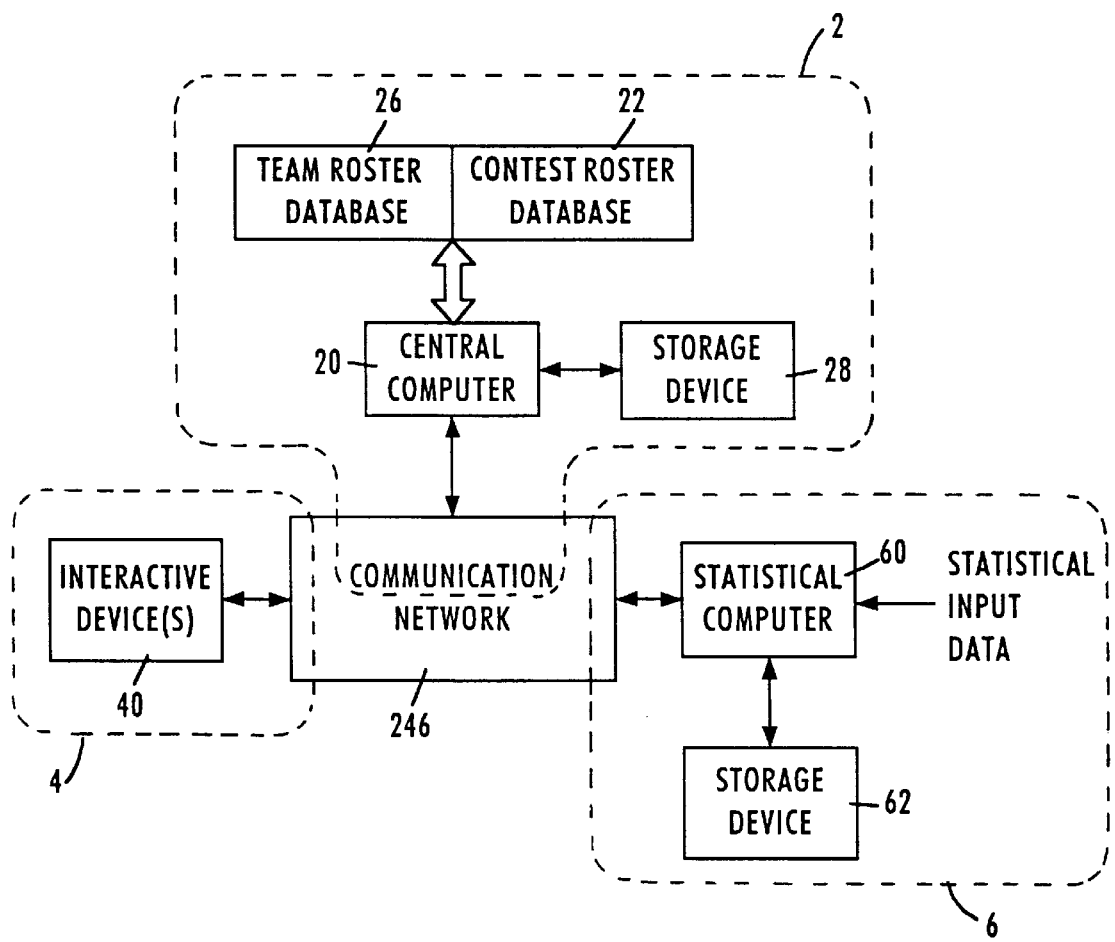
Figure 1A
Figure 1B

INTERACTIVE SYSTEM ALLOWING REAL TIME PARTICIPATION

TECHNICAL FIELD

This invention relates to an interactive system, and more particularly, to an interactive contest system which allows participants to optimize the performance of their team rosters based on the performance of the members as an event is occurring in real time through the selection and trading of players in the event.

BACKGROUND ART

Professional or college sports support a broad range of secondary competitions ranging from predicting the outcome of particular games to predicting the performance of a given player. Contests based upon player performances include the fantasy sports leagues such as fantasy baseball and fantasy football. In the fantasy sports leagues, sometimes called "rotisserie leagues", participants assume the position of an owner of an imaginary team. Prior to the beginning of a professional sport season, the owners conduct a "draft" of professional athletes to fill the roster of their team.

As in the professional sports leagues, the fantasy owners may trade players during the contest. Typically, after the draft, and throughout the season, trades are made between owners of those players not selected in the initial draft. The teams in a fantasy sports league typically accumulate a "won-lost" record by competing head to head against each of the other teams in the league. In a "game" between two teams, the team whose players performed better in the previous week is declared the winner. Typically, each team competes on the cumulative statistics of the drafted players.

U.S. Pat. Nos. 5,018,736 and 5,263,723 describe an interactive contest system using publication of newspapers and broadcast of events to enable fantasy owners to optimize scores obtained by a team through team member trades. However, the system is not interactive on a real time basis. As interaction with the contest system on a real time basis with the sporting events is characterized as being disadvantageous, the described contest system hence utilizes selection and trading of players based on periodic publication or broadcasts.

Periodic interaction of participants prevents optimization of team roster performance and enjoyment of the interactive system. In the above system, the participants only select and trade members after the event has ended for the day. For example, in a FANTASY NASCAR race, the participant must decide prior to the race whether to select or trade the racer. And then must wait until after the race is over to get the result of the race car driver's performance. If the system distributes scores for the number of other cars Petty passes, the participants must wait until the end of the day as to whether to keep or trade Petty.

On the other hand, if the system were to allow real time interaction, the participant could decide whether or not to keep Petty as he is passing other cars or being passed. If the participant believes that Petty will pass more cars, he or she may decide to keep Petty as a member of the team. If the participant believes that another car driver, such as Steve Andretti, will pass more cars than Petty, the participant can trade Petty for Andretti.

Once the participant has made a decision, he or she can watch the race with excitement as to whether that decision is the right or the wrong one. Further, as the race goes on, the participant can make more trades to optimize the performance of his or her team roster. By allowing a participant to interact in real time while the race is going on, the participant can better maximize the score values for his team, and experience more emotional and intellectual enjoyment compared to what is likely in a periodic interaction. Hence, there is a need for an interactive system allowing real time interaction as the event unfolds.

DISCLOSURE OF THE INVENTION

An advantage of the present invention is in increasing the enjoyment of an interactive game.

Another advantage of the present invention is an improved interactive system allowing participants to interact with a game as an event occurs in real time.

Another advantage of the present invention is in maximizing the total points generated by a team selected by a participant.

Another advantage of the invention is in increasing interaction between the participant, the event and interactive system by allowing the participant to select and trade members as the event unfolds in real time.

A further advantage is in increasing both the intellectual and emotional enjoyment to a participant viewing an event such as a sport.

Still a further advantage of the invention is in increasing the level of skill and knowledge of a participant to an event such as a sport.

According to the present invention, the foregoing and other advantages are achieved in part by an interactive apparatus and method to allow participants viewing a video display, such as "ticker tape," indicating the performance of players in an event occurring in real time to optimize scores accumulated by the participants' teams. In a first embodiment, a central controller is coupled to an interactive apparatus and/or a statistical controller while in an alternative embodiment, the statistical controller is coupled to both the interactive apparatus and the central controller. The central controller includes a central computer coupled to contest roster and team roster databases, a storage device and a communication network. The interactive apparatus includes an interactive device(s) coupled to the communication network. The statistical controller comprises a statistical computer coupled to a storage device and the communication network, and receiving statistical input. In another embodiment, the central computer directly receives the statistical input.

The ticker tape may be continuously shown on the display device of the interactive apparatus with up-to-date score values indicative of the players, performance in the event. Alternatively, the ticker tape may be broadcast intermittently or called up by a player on demand, on screen, via audio text delivery or by some other communication device. To select and trade players on a participant's team, a menu provides relevant information regarding the performance of the participant's team players, and allows the participant to select and trade the players on the participant's team with other players listed in the contest roster database while the event is occurring in real time. By allowing the participant to interact in real time, the intellectual and emotional enjoyment of the interactive game is greatly enhanced.

Additional objects, advantages and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF DRAWINGS

The invention will be described in detail with reference to the following drawings in which like reference numerals refer to like elements wherein:

FIGS. 1(A–B) are illustrations of the present invention in accordance with one embodiment;

BEST MODE FOR CARRYING OUT THE INVENTION

Figure 2A:
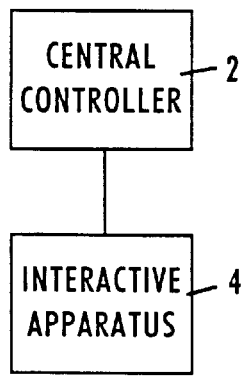
FIGS. 2(A–B) are illustrations of the present invention in accordance with another embodiment.

FIGS. 1A–3A illustrate three different embodiments of the present invention, and FIGS. 1B–3B illustrate detailed components of the systems illustrated in FIGS. 1A–3A. In the FIGS. 1(A–B) and 2(A–B), a central controller 2 is coupled to an interactive apparatus 4 and/or a statistical controller 6 while in FIG. 3(A–B), the statistical controller 6 is coupled to both the interactive apparatus 2 and the central controller 4.

Figure 2B:
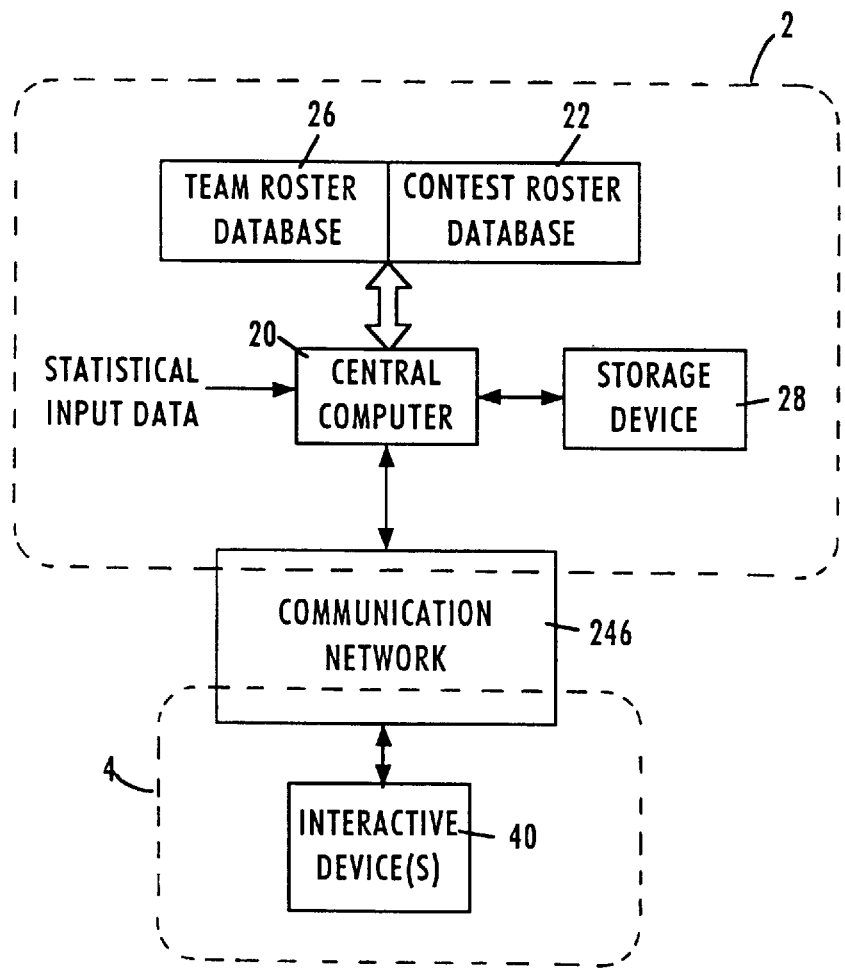
Figure 3A:
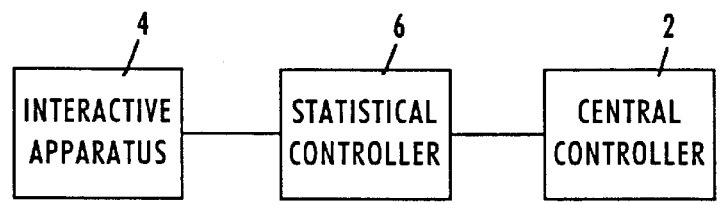
FIGS. 3(A–B) are illustrations of the present invention in accordance with another embodiment of the present invention.
Figure 3B:
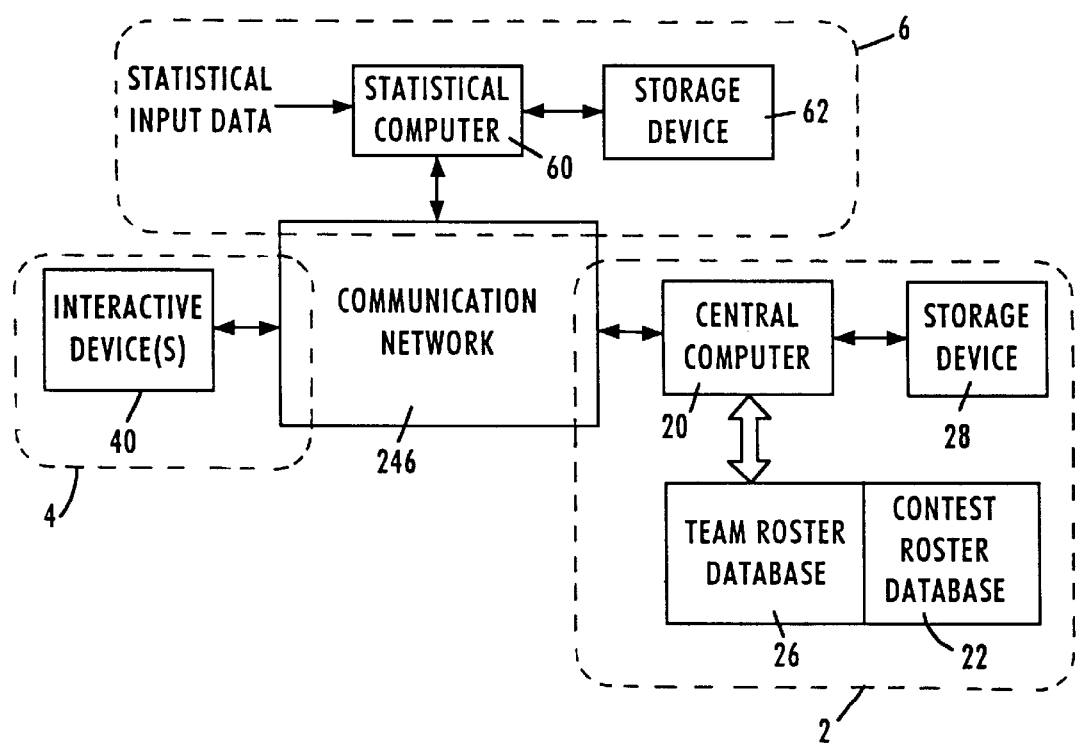

The central controller 2 includes a central computer 20 coupled to a contest roster and team roster databases 22 and 26, a storage device 28 and a communication network 246. The interactive apparatus 4 includes an interactive device(s) coupled to the communication network 246. The statistical controller 6 comprises a statistical computer 60 coupled to a storage device 62 and the communication network 246, and receiving statistical input data. In the embodiment of FIGS. 2(A–B), the central computer 20 directly receives the statistical input.

Communication Network

The communication network 246 couples the interactive device 40, the central computer 20 and/or the statistical computer 60. The dotted lines indicate that each of the central controller 2, interactive apparatus 4 and the statistical controller 6 include appropriate devices for communication. For example, the apparatus 4 and controllers 2 and 6 may include modems for telephone line communication and transmitters and/or receivers for optical, cable, microwave or satellite communication to allow the participants to interact in the game in real time while watching a display device of the interactive device showing the event or a video program. Alternatively, communication between the participant and central controller can be audio text delivery in response to touch tone telephone input.

Central Controller

The central computer 20 includes or has access to the contest roster database 22 which includes a list of athletes which can be relied upon in the contest or the event. Computer 20 has access to the team roster database 26 which includes the team rosters as selected and entered by each of the participants, including identifying information which associates a team roster to the corresponding participant. The central computer 20 also has access to the player score for each player on the contest roster database 22. Although the contest roster and team roster databases 22 and 26 are shown in unity, they can be separate databases.

The central computer 20 is adapted to recognize and distinguish machine recognizable signals transmitted from the interactive device 40 and/or statistical computer 60. The central computer 20 may be implemented by any of a plurality of commercially available computer systems. The processing and storage capacity needed depends upon the anticipated number of participants. The storage device 28 may be any one of a plurality of commercially available devices, such as a floppy or hard disk, magnetic or optical, or any combination thereof.

The contest roster database 22 includes a list of athletes or players who participate in the relevant sport. Preferably, the contest roster database 22 lists or includes all of the actual players in the professional league (or alternatively the players in a particular college conference or division or the players participating in a specified event) of the sport associated with the contest. In addition to personal favorites, the contest roster database 22 includes those players likely to have an impact on the sport during the season. The number of players included on the contest roster database 22 may be chosen according to specific considerations of the relevant sport or event and will not necessarily include all the actual athletes who play the sport.

For sports such as basketball or hockey, wherein each position of the team is highly significant, each professional team typically has more than one player for each position in real life. To closely simulate such real life situations within the interactive system, the contest roster database 22 may include more than one player from each professional team for each position. Further, similar positions may be classified within a single category.

For example, in real life baseball, the right fielder, center fielder and left fielder may be treated collectively as outfielders. The contest system may incorporate a contest roster database 22 which categorizes all players who play right field, left field, and center field in real life, collectively, as outfielders. In the preferred embodiment of the contest system, a participant may choose three outfielders from the contest roster database 22 even if they all, for example, play center field in real life.

Also, some positions of the event may inherently generate very few statistics used to gauge a player's performance. Such positions need not be included as a category within the contest roster database 22. For example, in real life football, the guard and tackle positions generate relatively few distinguishing characteristic statistics such as yards gained or touchdowns. Therefore, the contest roster database 22 may not include these positions or players. However, even if a position is not included as a category on the contest roster database 22, a particular athlete playing that position may still be included on the contest roster database 22 if that particular player is likely to generate statistics accounted for in the player score calculation.

Therefore, the positions and players listed on the contest roster database 22 may represent an accommodation of the characteristics of the sport, as typically monitored by the sports industry. In other words, since a player's performance is typically monitored in relation to the statistics which the player generates, it is probable that those players who are likely to generate statistics will be selected to appear in the contest roster database 22. The statistics which are recognized throughout the industry as indicators of a player's performance, are advantageously included as factors when calculating player score.

In events such as NASCAR or golf, there are generally no teams. In such a sport, the participant can select a prescribed number of players/members of the event to comprise his team. The prescribed number can be a wide range of numbers, but equal to at least one. The participant can select one or more players in the event the participant believes will score well based on the scoring system established for the contest.

Further, an event may run for a single day or a number of days. In a sport like tennis, there is an elimination process, and in sports like golf and NASCAR, the players must qualify to continue playing in the event by playing above a specific level. In track and field, different events are held on different days. Other sports require several days of competition to determine the winner of an event. Although sports like basketball are usually completed in a day, there are occasions, such as the NCAA Basketball tournament, where an elimination process is used to determine the winner over several days or weeks.

If an event is played over several days, the participants can select and trade from the contest roster database 22 the players who will be competing that day to comprise the teams. A winner of the interactive game can be chosen based on the highest score for the day or the highest aggregate score during the entire event. The participants may forego the qualifying round of the event, and choose from the contest roster database 22 the players who have qualified for the final round of the event. The winner of the interactive game may be chosen based on the highest score for each day of the final event or the aggregate highest score over the days in which the final event is held. Alternatively, the participant can participate in a combination of the above.

For example, in a golf tournament which usually lasts four days, the participant can play the interactive game for each entire four days, only the last two days after the qualification rounds are over, or just the final day of the competition, however that particular interactive game is structured. A winner of the interactive game can be chosen based on the aggregate scores of the participants for the entire four days or based on the scores for each day. If the participant chooses to participate during the last two days of the final rounds, a winner can be chosen based on the aggregate scores for both days or a winner with the highest scores for each day.

Preferably, each player on the contest roster database 22 is associated with a specific code uniquely identifying that specific player with respect to all other players in the contest roster database 22. For example, each player of the golf tournament is identified by a four-digit numerical code. The numerical code is used to identify a specific player during communications between the participant and the central controller 2.

In addition to the identification code associated with each player in the contest roster database 22, a quantitative indicator of each player's performance for each day or cumulative over a season, or in weekly increments can be included in the contest roster database 22. The quantitative indicator of a player's performance is determined as a function of the player's real life statistics. Each player's real life statistics are available through the statistical controller 6 (discussed in detail hereinafter), as illustrated in FIGS. 1(A–B) and 3(A–B) or through the central controller, as illustrated in FIGS. 2(A–B). The real life statistics of a particular player are converted into a quantitative (i.e., numerical) score by means of the game system formula.

Figure 4:
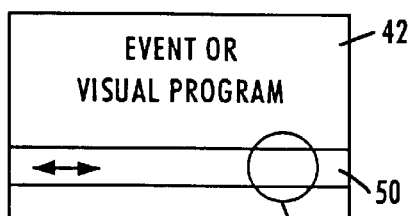
FIGS. 4, 4A and 4B are illustrations of menus on a display device of an interactive device illustrated in FIGS. 1B–3B of the present invention.
Figure 4A:
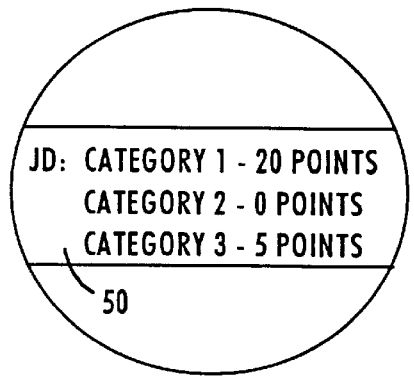

A list of the players in the contest roster database 22, along with each player's code number are displayed on a display device of the interactive device 40. The list can be continuously shown on a "ticker tape" 50 displayed on each screen, as illustrated in FIG. 4A, and can be updated in real time as each event takes place. A display format different from a ticker tape is, of course, possible. Further, the participant can access more information on the players in an event by appropriate commands inputted into the interactive device 40 by the participant.

The team roster database 26 includes a list or array of team rosters as entered by each participant. Each participant may be asked to identify himself or herself by some means, such as a home telephone number, a social security number and/or a combination thereof. The participant is asked to choose a team roster of players from the contest roster database 22. The team roster is then converted into digital information and stored as an individual file in the team roster database 28. Each file is addressed or accessed in a conventional manner using the information disclosed by the participant, e.g., the participant's social security number, as an address code.

Each participant's team roster file also includes the cumulative real time team score, and the cumulative up-to-date team score. In addition to these scores, each team roster in the team roster database includes the answers to one or more tie-breaker questions as entered by each participant (described hereinafter). Once a participant has selected a team roster, a person may only access the selected team roster using the identification information provided by the participant. A participant can access in real time his or her selected team roster in order to evaluate the performance of the team, to verify the players on the current team roster, or to trade a player from the team roster.

Statistical Controller

The statistical controller 6 includes a statistical computer 60, a storage device 62, and receives the statistical input data. The statistical computer 60 also has within its memory the formula used to convert the selected player statistics into a numerical performance value for each player. The statistical computer 60 continuously computes the numerical performance value for each individual player as it receives the statistical input data. The statistical controller 6 is separate from the central controller 2 in the embodiments of FIGS. 1(A–B) and 3(A–B). As shown in FIGS. 2(A–B), the functions provided by the statistical controller 6, including the calculation of the player score, can be combined with those performed by the central controller 2 such that only one computer system is required.

In the embodiments of FIGS. 1(A–B) and 3(A–B), the statistical controller 6 provides a list of selected statistics for each member of the contest roster database 22. The statistical controller 6 provides the selected statistics corresponding to the actual performances of each of the athletes listed in the contest roster database 22. These selected statistics are continually updated in real time basis as the event takes place. Although a wide variety of statistics may be employed, the chosen statistics represent the most popular aspects monitored in the event.

The real time statistics of each player listed in the contest roster database 22 are received and inputted into the statistical computer 60. The storage device 62 stores the real time statistical input data when there is an overflow of data or the central computer is not ready to receive the performance score. The real time statistics of each player are evaluated by the statistical computer 60 according to the player score formula so that a quantitative performance indicator score for each player is obtained on a real time basis. The quantitative performance indicator scores are then sent via the communication network 246 to the contest roster database 22 via the computer 20. Alternatively, the central computer 20 receives the real time statistical input data, and performs the calculations to determine the scores for each player, as shown in FIGS. 2(A–B).

Calculation of Individual Player Score and Team Score

The interactive system provides for the evaluation of the players according to selected real life statistics from the statistical input data. In the embodiment of FIGS. 1(A–B) and 3(A–B), the calculation of the individual player scores is done by the statistical computer 60 within the statistical controller 6. Alternatively, the central computer 20 can perform such calculations, as illustrated in the embodiment of FIGS. 2(A–B). The player score calculation includes a plurality of factors which correspond to the characteristics provided by the statistical input data. The score calculation allows for the evaluation of each player on the contest roster database 22 according to the statistics generated by that player. For instance, a player with a particular score would be evaluated as doing better than another player who has a lower score. Hence, a quantitative comparison can be made between players on the contest roster database 22.

The player score calculation may provide for the weighing of certain statistics depending on the importance, difficulty or occurrence rate of each statistic. In addition, the player score calculation may be uniquely tailored to accommodate a particular event. Preferably, the formula for calculating the player score is available to all participants so that each participant may conduct an independent evaluation of their team roster with respect to the players on the main contest roster database 22.

For example, in NASCAR racing, racers/players can score points for lap speed, number of laps leading the race, number of laps in second place, third place, fourth place, etc., length of pit stops, position when race is finished and combinations thereof. If, for example, Kyle Petty has the fastest lap time of 202.5 mph, he can score a particular number of points. If Petty makes a pit stop of 44 seconds to change his tires, which is much longer than the usual pit stop during the race, he loses a particular number of points from his total performance score. During the next lap, if he passes fourteen cars and moves to within five cars of the leader, Petty can gain some appropriate number of points for both passing fourteen cars and being in fifth place after one lap.

In golf, the golfers/players can score points for a hole in one, an eagle, a birdie, the longest drive on a hole, first on the green, closest to the pin, first in the hole, low score, total score, etc. For example, if John Daley is on a team, and his first shot off the tee is the longest drive on the hole, he scores a prescribed number of points for this achievement. If his next shot lands in the front of the bunker off the left side of the green, and another player lands his ball on the green first, the other player gains some points for being the first one on the green. Although Daley does not lose any points, he has lost his opportunity to gain additional points. If his next shot is closest to the hole, Daley scores additional points and more points if he putts for a birdie.

Interactive Apparatus

Figure 4B:
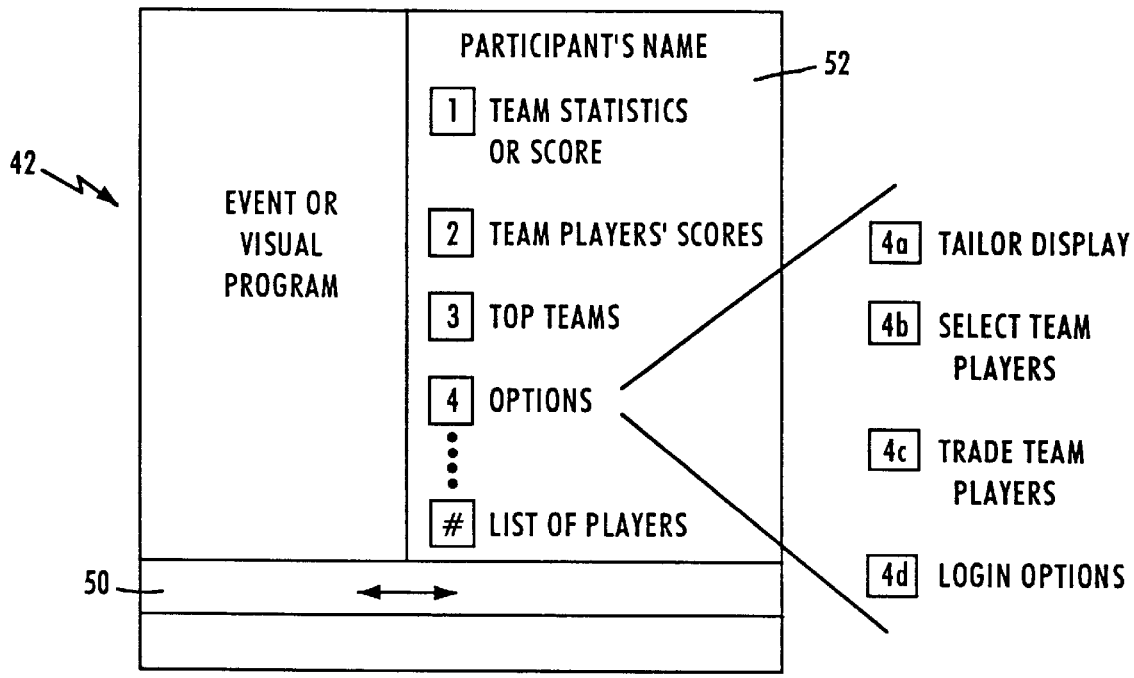

FIGS. 4A and 4B are illustrations of displays of the interactive device 40. As shown in FIG. 4A, a ticker tape 50 is shown at the bottom of the display screen as the participant is watching the event such as golf or a non-event related visual program. The statistical controller 2 and/or the central controller 6 communicates with the interactive device 4 to visually provide the event and the ticker tape 50. The ticker tape 50 contains the real time score values regarding the performance of the athletes/players of the event.

While the participants are watching golf, the ticker tape 50 continuously, intermittently or on player demand provides up-to-date real time performance score values of the players. For example, the ticker tape may show John Daley's initials or code followed by his aggregate score or the number of points in each category, e.g., a hole in one, an eagle, a birdie, the longest drive on a hole, first on the green, closest to the pin, first in the hole, low score, total score, etc. Alternatively, the ticker tape 50 can show the category followed by top three players in each category and/or points the players have accumulated in that category. The ticker tape 50 can also show top teams and the points of each team. As can be appreciated, the format of the ticker tape 50 can be tailored in any fashion based on the information provided by the central controller 2 and the statistical controller 6. Further, the ticker tape 50 can be located at any appropriate location on the display. Display formats other than a ticker tape are possible, e.g., a separate screen or split screen of either horizontal or vertical orientation.

Figure 4C:
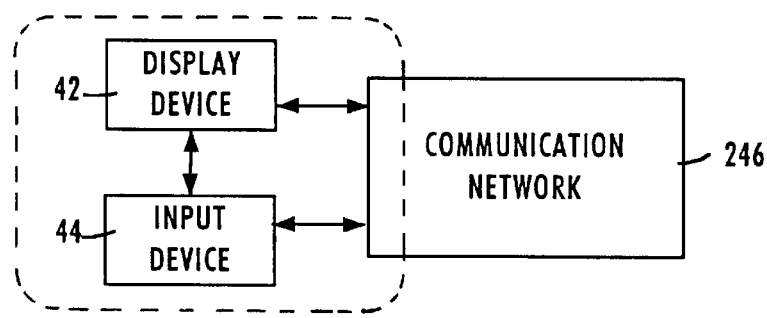
FIG. 4C is a detailed illustration of the interactive device illustrated in FIGS. 1B–3B of the present invention.

To implement the display of the event or the visual program, the interactive device 40 includes a display device 42, as illustrated in FIG. 4C. The display device 42 may be a television screen, a display device of a computer system, etc. The central controller 2 and/or statistical controller 6 can transmit such a visual display by broadcasting (via satellite or microwave transmission), by telephone (via modem), by communication lines (via cable or optical fiber), any combination thereof or any other one- or two-way communications device. The transmitter and/or modem of the central controller 2 and/or statistical controller 6 transmits the event and/or ticker tape in real time to the receiver and/or modem of the interactive device 42.

The participant can access his team roster anytime using an input device 44. The input device 44 may be a keyboard of a computer, a telephone pad, touch sensors on the display device 42, remote control of the television, sensors for voice synthesizer, or combination thereof. After inputting the appropriate identification information, such as the participant's social security number, telephone number, password, identification number or combination thereof, the central controller 2 or the statistical controller 6 transmits to the display device 42 a menu 52 adjacent to the actual event or the visual program, as illustrated in FIG. 4B. Alternatively, athlete's scores may be displayed/heard only via audio text, not on screen, e.g., if a participant is using a computer there will be a visual display but if the participant is limited to a phone, there will be provided an audio menu.

The menu 52 can show the name of the participant, the names of the players on the participant's team, total points of each player on the team, top players in each category of the event, scores of top teams among the participants, total score of the participant's team, teams in a private league, total score of the team over the season, list of players available in the contest roster database 22 or a combination thereof. Further, the menu 52 includes an option menu to tailor the display of the menu 52. As can be appreciated, the format of the menu can be tailored in any fashion based on the information provided by the central controller 2, the statistical controller 6 and the needs of the participant.

Included in the option menu are options for tailoring the menu 52, selecting the team players, trading team players and login options to change the identification information. To access or change any of the information on the menu 52, the participant can input the appropriate command via the input device 44. For example, to access the option menu, the participant can press the arrow keys on a keyboard to highlight the option menu and press the enter key. The participant can press the numeral 4 on the remote control of the television, the keypad of the telephone or the keyboard of the computer. Even while the participant is accessing the menu 52, the ticker tape 50 provides up-to-date real time score values about the performance of the players in the event. The ticker tape may be displayed continuously, intermittently or on user demand. Scores may be broadcast in alphabetical order of players, and the touch tone pad of a telephone can be used by the participant to skip ahead or drop back, similar to a voice mail system.

As an alternative to visual display of a ticker tape or the like on a TV screen in normal broadcast, the player and team information may be conveyed to participants in other ways. For example, telephone participants may receive the information in audio form only, or alternatively in audio-video form, over network lines on a demand basis. Another possibility is display on a PC display which may present the information interactively.

Interactive Game

While watching the visual program or the event on the display device 42, the viewer sees the ticker tape 50. For example, a viewer is watching a golf tournament on television, and the ticker tape 50 appears at the bottom of the screen showing the real time performance score values of the golf players. The ticker tape 50 also periodically provides information to the viewer brief information about the interactive game, and the telephone number to call to participate in the interactive game, the telephone number to access the central controller 6 via a computer modem or the appropriate command on the television remote to access the central controller 2.

For simplicity, the following is a description of a system where the display device 42 is a television coupled to a communication network 246 comprising a cable line with a cable box which allows a viewer to send information to the central controller 2 by depressing appropriate keys on the remote control, and the television 42 displays the information received from the central controller. When the viewer decides to participate in the interactive game of golf, the viewer depresses an appropriate key command on the remote, which may be a sequence of numbers or an "activation" key on the remote. The command is transmitted to the central controller 2, and the controller responds by transmitting onto a portion of the display of the television asking the viewer to enter his identification information. Other possibilities include viewer entry by touch tone phone or PC with modem communication.

The controller 2 verifies the identification information by searching the cable subscription membership list stored in the storage device 28. If the identification information is incorrect, the controller 2 transmits over the cable line to the cable box or other device for displaying a message on the television screen that the identification information is incorrect, and instructions to reenter the identification information. If the identification information is correct, the controller 2 will transmit the video information over the cable line to the cable box for displaying the menu 52 onto the television screen. Alternatively, each cable subscriber can be given a unique code when he/she subscribes to the cable service. The unique subscription code can be used to activate the interactive game.

Since the viewer/participant is accessing the interactive game contest for the first time, the menu includes a menu driven option for finding out more about the interactive game and the rules for playing the game. Further, the menu 52 provides a message to access the options menu for selection of players on participant's team. When accessed by depressing the appropriate number on the keypad, the participant selects the "select team player" menu. The central computer 2 then transmits onto the television screen a list of the players in the event, which may be displayed in alphabetical order, by category, by age, by real time score values, etc.

When a player is selected, the controller 2 transmits onto the view screen all the statistical information regarding the player, including past performances and real time score values accumulated by the player in each category. If the participant wants the player on his team, the participant depresses the key or keys on the remote control 44 indicating selection of the player, and the player is added to the participant's team. The participant repeats this process until all the players of the team have been selected, and exits the selection menu by depressing the appropriate key sequence on the remote control, where the menu 52 continuously provides relevant information for navigating through the menu 52.

The participant completes the initial selection process sometime prior to the start of the golf tournament depending on how long the golf tournament lasts. For example, if the tournament runs four days, but the contest covers only the last two days of competition, the participant can select his team prior to the last two days of the tournament. Further, the interactive system includes a process in the selection process to lessen the likelihood that the participants will choose the same players of the tournament. This process may employ a salary cap, a requirement to choose a given number of players from different pre-established skill/value categories, a selection of players prior to the start of the event and prior to any of the players being eliminated from the competition or any combination thereof. Other criteria can be chosen based on the event.

However, there is a possibility that some participants will have the same highest score at the end of the golf tournament. Hence, the menu 52 also directs the participant entering the interactive game for the first time to answer a prescribed number of tie-breaker questions, and the answers are stored in the team roster database 26. For example, the participant is required to provide an answer which player will have the lowest score after the golf tournament, which player will have the most number of pars, birdie, eagle, etc., which player will lead the tournament after all the players have played the ninth hole, etc. A combination of such question can be used, and the answers are used at the end of the tournament to break the tie between the participants. Whoever provided answers which most closely match the actual outcome of the tournament will be the winner.

Once the initial login and selection processes have been completed, the participant is ready to play the interactive game. To promote competition, prizes may be given to teams with the highest scores after each hole is played, after each day of competition, after each period of play during the qualifying round and actual rounds of the golf tournament and after the entire four days of the tournament, etc. Further, if an event, such as basketball, is played during a season, prizes may be given to a team with the highest score after the season, after each weekly period or after a single game or event. Prizes may also be awarded to participants at random to encourage participants who do not have high team score to participate in the interactive game.

Because the factors which are likely to affect the performance of a given player are generally better evaluated by those participants who are familiar with the particular event associated with the interactive game, those participants who are knowledgeable in the event are more likely to choose high team scoring rosters. Hence, a certain skill factor is involved which gives those participants who are knowledgeable in the event associated with the interactive game an advantage.

However, some participant may be new to the event, and less skilled. The menu 52 allows the participant to be involved in different levels of the interactive game. There may be a beginners level, intermediate level and advanced level. To encourage the participant to more actively participate in the interactive game and to become more skilled, the prizes can be given to the participants within each level, and the prizes at the advanced level may be more valuable compared to the beginners level.

The primary objective of the interactive game is to optimize/maximize the total points generated by the participants' team roster. Throughout the golf tournament, the interactive game apparatus permits each participant to optimize the scoring potential of the individual team roster through an exchange of players between the participant's team roster and the contest roster database 22. As indicated previously, the same player may be selected by more than one participant and thus a given player could conceivably be included as a member of all of the team rosters. Further, the trading is done in real time.

For example, a participant is watching the golf tournament on television and the ticker tape 50 displays in real time the performance of the players during the event. This display can be continuous, intermittent or on player demand. Alternatively, the participant may be watching a video program such as a sitcom, and the ticker tape 50 continuously displays the real time performance score values of the players in the golf tournament. The participant can access the menu 50 anytime while watching the television by depressing the appropriate key or key sequences on the remote control to find out the performance of his team and team members. Such access command may be the unique subscription code of the participant.

Once accessed, the various information as described above are shown to the participant. Either through the ticker tape 50 or by watching the golf tournament, the participant realizes that John Daley is about to tee off on the eighth hole. The participant can access from the central controller 2 the statistical information regarding John Daley. Based on the statistics, the participant believes that John Daley will have the longest drive at the eight hole, and will have a good round on the eighth hole. The participant accesses the trade option from the menu 52, and decides to change one of his poor performing team player for John Daley. The trade is immediately implemented by the central controller, and adds John Daley as a member of the participants' team and removes the traded player from the team.

Once the trade has been made, the participant can watch with excitement as to whether his trade was the right one or the wrong one. If John Daley drives the longest drive off the tee, John Daley receives a prescribed number of point values, and the team point value increases. If John Daley does not hit the longest drive, the team value remains the same. In fact, the player which the participant has traded hits the longest drive. Hence, the participant missed his opportunity to gain more points for his team by trading the player.

As can be appreciated, there must be some restriction in the number of trades that can be made, when trades can be made, how late in the event trades can be made, who can be traded, etc. In the above example, the participant cannot trade John Daley for the same player that was traded earlier, after John Daley has teed off. Such restrictions help to sharpen the skill of the participant by motivating the participant to make the right trades depending on the statistics of the players. These restriction on trades will change based on the specific event involved and the media partner and/or sponsor.

In the embodiments of FIGS. 1 and 3, the circuitry to implement the functions of the central controller 2 can be provided by a company independent of a video program sponsor of the event who provides the circuitry to implement the functions of the statistical controller 6. Alternatively, a company can provide the statistical input data independent from the company providing the circuitry to implement the functions of the statistical controller 6. In the embodiment of FIG. 2, an independent company can provide the statistical input data from the company providing the circuitry necessary to implement the functions of the central controller 2. As can be appreciated, many variations are possible to implement the functions of the central and statistical controllers 2 and 6.

As described above, the interactive device 40 can be a computer. In such an instance, the participant can receive video information to display the golf tournament and display the menu 52 on the computer screen via modem communication. With the microprocessor, the computer can be provided with the necessary program to independently calculate the performance score of the team from the statistical controller 6. Such a set up may be useful in the embodiment illustrated in the embodiment of FIGS. 2(A–B). Further, the computer can be provided with the necessary software to allow a group of participants to have their own private league.

For example, participants A, B, C and D are friends. They wish to set up a private league where each of their computers can calculate in real time the performance of their teams A, B, C and D. Each believes that he/she is more knowledgeable than the others. Each sets up their own team, and award each other prizes for having the highest score in each category or highest team scores at the end of a play during the event or after the entire event is over. By allowing the computers to set up their own league, each participant can be continuously informed of the performance of the other participants' teams. Such arrangement increases the enjoyment and competitive nature of the interactive game.

As the above illustrates, the foregoing embodiments are merely exemplary and not to be construed as limiting the basic concept of validating cell libraries. Moreover, while golf, NASCAR, basketball and baseball have been mentioned toward the applicability of the interactive system, the present invention is applicable to any event which allows the participant to interact in an interactive game based on an event which takes place in real time.

I claim:

1. An interactive game system comprising:

means for generating real time score values indicative of performances of players involved in an event;

means for conveying to each participant at least one of the real time score values of the players; and means for enabling selecting at least one player to comprise a team for each participant of the interactive system based on the real time score values of the player.

2. The interactive system of claim 1, wherein said generating means comprises:

storage for real time score values of each player of each participant's team and real time score values for each player in the event.

3. The interactive system of claim 1, wherein said generating means includes first means for converting statistical input data into real time score values for each player; and second means for receiving said real time score values and accessing at least one of said first and second storage devices.

4. The interactive system of claim 3, wherein said first and second means are computer implemented.

5. The interactive system of claim 1, wherein said generating means, conveying means and selecting means are coupled together by a communication network.

6. The interactive system of claim 5, wherein said communication network comprises at least one of (1) modem to modem connection via telephone lines and (2) at least one of transmitter and receiver communication via cable lines, fiber optical lines, microwave transmissions and satellite transmissions.

7. The interactive system of claim 1, wherein said conveying means comprises a display device capable of displaying video information including a ticker tape format display containing the real time score values.

8. The interactive system of claim 1, wherein said conveying means produces audio information.

9. The interactive system of claim 7, wherein said video information comprises at least one of the event and a video program.

10. The interactive system of claim 7, wherein said display device includes means for receiving touch or voice input from the participant.

11. The interactive system of claim 1, wherein said selection means includes:

means for providing real time scores of all players in the event;

means for receiving inputs from the participant; and means for adding a player to the team upon input from the participant.

12. The interactive system of claim 1, wherein said selecting means allows each participant to optimize the performance of the team compared to teams of other participants.

13. The interactive system of claim 1 further comprising means for enabling trading at least one player of the team with other players of the event.

14. The interactive system of claim 13, wherein said trading means comprises:

first means for enabling selecting one player from the team;

second means for enabling selecting another player involved in the event; and third means for enabling replacing the one player with the other player to reform the team.

15. The interactive system of claim 14, wherein said first and second means includes a touch pad input accessible to each participant.

16. The interactive system of claim 1, wherein the event is a sports competition.

17. An interactive game system comprising:

a controller for generating real time score values indicative of performances of players involved in an event;

an interactive device for displaying video information to each participant of an interactive game based on the event; and a communication network coupling said controller and said interactive device such that the real time score values are conveyed to each participant, wherein said controller comprises a central controller having:

a first storage device for storing real time score values of each player in the event;

a second storage device for storing said real time score values for each player in the event; and a first computer for accessing at least one of said first and second storage devices.

18. The interactive system of claim 17, wherein said controller further comprises a second computer for converting statistical input data into real time score values of players, and said first and second computers are coupled together by said communication network such that said first computer receives said real time score values.

19. An interactive game system comprising:

a controller for generating real time score values indicative of performances of players involved in an event;

an interactive device for displaying video information to each participant of an interactive game based on the event; and a communication network coupling said controller and said interactive device such that the real time score values are conveyed to each participant, wherein said real time score values are displayed in a ticker tape format.

20. An interactive game system comprising:

a controller for generating real time score values indicative of performances of players involved in an event;

an interactive device for displaying video information to each participant of an interactive game based on the event; and a communication network coupling said controller and said interactive device such that the real time score values are conveyed to each participant, wherein said interactive apparatus comprises one of a computer system, a telephone, a video monitor, touch sensors, a remote control, a voice synthesizer, and a combination thereof, and further includes a touch tone pad for supplying participant entered data to said network.

21. An interactive game system comprising:

a controller for generating real time score values indicative of performances of players involved in an event;

an interactive device for displaying video information to each participant of an interactive game based on the event; and a communication network coupling said controller and said interactive device such that the real time score values are conveyed to each participant, wherein said controller includes:

means for allowing each participant to access a first roster database containing real time score value of players in the event;

means for allowing each participant to select at least one member of the event to comprise a team for each participant of the interactive game; and means for allowing each participant to access a second roster database containing real time score values of players on each participant's team.

22. The interactive system of claim 21, wherein said interactive apparatus includes means for inputting commands to be sent to the controller such that each participant can add or delete a player to the team for optimizing the performance of each participant's team compared to other participants.

23. The interactive system of claim 21, wherein said interactive device includes:

means for enabling selecting one player from the team;

means for enabling selecting another player involved in the event; and means for enabling replacing the one player with the other player into the team.

24. A method for playing an interactive game based on an event occurring in real time, the method comprising the steps of:

(a) generating real time score values indicative of performances of players involved in the event;

(b) conveying to each participant the real time score values of the players; and (c) based on step (b), selecting at least one member of the event to comprise a team for each participant of the interactive system.

25. The method of claim 24, wherein the step (c) comprises the steps of:

viewing the real time score of all players in the event;

receiving inputs from each participant; and adding a player to the team upon input from each participant.

26. The method of claim 31, wherein said step (a) comprises the steps of:

converting statistical input data into real time score values for each player;

storing real time score values of each player of each participant's team; and storing said real time score values for each player in the event.

27. The method of claim 26, wherein said step (a) further comprises generating video information to display a ticker tape containing the real time score values.

28. The method of claim 24 further comprising the steps of:

selecting one player from the team;

selecting another player involved in the event; and replacing the one player with the other player to reform the team.

29. The method of claim 31, wherein step (c) comprises visually displaying said real time score values.

30. The method of claim 31, wherein step (c) comprises conveying audio information on said real time score values.

* * * * *